(12) United States Patent
Smirnov et al.

(10) Patent No.: US 8,756,618 B2
(45) Date of Patent: *Jun. 17, 2014

(54) MOTOR HAVING A DISK SUPPORT MEMBER WITH AIR FLOW PATH PORTIONS AND A DISK DRIVE DEVICE HAVING THE SAME

(71) Applicant: Samsung Electro-Mechanics Co., Ltd., Suwon (KR)

(72) Inventors: Viatcheslav Smirnov, Suwon (KR); Dae Lyun Kang, Suwon (KR); Sang Kyu Lee, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/887,978

(22) Filed: May 6, 2013

(65) Prior Publication Data

US 2013/0239131 A1 Sep. 12, 2013

Related U.S. Application Data

(63) Continuation of application No. 12/929,337, filed on Jan. 14, 2011, now Pat. No. 8,448,202.

(30) Foreign Application Priority Data

Jul. 16, 2010 (KR) ........................ 10-2010-0068910

(51) Int. Cl.
*G11B 17/028* (2006.01)

(52) U.S. Cl.
USPC .......................................... 720/698; 720/703

(58) Field of Classification Search
USPC .............. 720/611, 698, 703, 709, 704, 99.08, 720/97.13; 360/99.08, 97.13, 611, 698, 360/703, 709, 704, 99.04, 98.07, 99.12
See application file for complete search history.

(56) References Cited

U.S. PATENT DOCUMENTS

| | | | |
|---|---|---|---|
| 5,453,890 A | 9/1995 | Takegami et al. | 360/97.13 |
| 5,995,480 A | 11/1999 | Naka et al. | |
| 6,392,976 B1 | 5/2002 | Lin | 720/611 |
| 6,643,251 B1 | 11/2003 | Ikuta et al. | 720/703 |
| 6,817,023 B2 | 11/2004 | Minase | 720/648 |
| 6,862,738 B2 | 3/2005 | Wu et al. | 720/651 |

(Continued)

FOREIGN PATENT DOCUMENTS

| | | |
|---|---|---|
| JP | 64-45334 | 3/1989 |
| JP | 05-135464 | 6/1993 |

(Continued)

OTHER PUBLICATIONS

Japanese Office Action mailed Jan. 8, 2013 in corresponding Japanese Patent Application No. 2011-010556. X.

(Continued)

*Primary Examiner* — Brian Miller

(57) ABSTRACT

A motor including: a rotor case having a chucking device, on which a disk is mounted, press-fitted and coupled thereto; disk support members mounted on an upper surface of the rotor case to support a bottom surface of the disk, and having each of flow path portions therebetween allowing for airflow in a space between the disk and the rotor case; and a push portion disposed in at least one of the rotor case and the disk support members to accelerate the airflow through the flow path portions when the rotor case rotates.

11 Claims, 11 Drawing Sheets

(56) References Cited

U.S. PATENT DOCUMENTS

| | | |
|---|---|---|
| 6,868,549 B2 | 3/2005 | Watanabe et al. |
| 7,027,385 B1 | 4/2006 | Shimazaki et al. ............ 389/281 |
| 7,430,750 B2 | 9/2008 | Lee et al. ....................... 720/648 |
| 2003/0133390 A1 | 7/2003 | Chuang et al. ................ 369/75.2 |
| 2004/0216153 A1 | 10/2004 | Ota ................................ 720/703 |
| 2005/0188396 A1 | 8/2005 | Lee et al. ....................... 720/703 |
| 2006/0072433 A1 | 4/2006 | Matsushita et al. |
| 2007/0130578 A1 | 6/2007 | Ido et al. ....................... 720/703 |
| 2008/0307448 A1 | 12/2008 | Fukagawa et al. |
| 2010/0123975 A1 | 5/2010 | Smirnov et al. ............. 360/97.02 |
| 2010/0313212 A1 | 12/2010 | Nakanishi et al. ............ 720/703 |
| 2012/0005698 A1 | 1/2012 | Kang et al. .................... 720/703 |

FOREIGN PATENT DOCUMENTS

| | | |
|---|---|---|
| JP | 8-279242 | 10/1996 |
| JP | 2002-56663 | 2/2002 |
| JP | 2004-326992 A | 4/2003 |
| JP | 2003-162890 | 6/2003 |
| JP | 2005-353114 | 12/2005 |
| JP | 2008-181622 | 8/2008 |
| KR | 10-0176572 | 11/1998 |

OTHER PUBLICATIONS

Restriction Requirement mailed from the Unites States Patent and Trademark Office on Jul. 30, 2012 in the related U.S. Appl. No. 12/929,337.

Office Action mailed from the Unites States Patent and Trademark Office on Oct. 1, 2012 in the related U.S. Appl. No. 12/929,337.

Notice of Allowance mailed from the Unites States Patent and Trademark Office on Jan. 14, 2013 in the related U.S. Appl. No. 12/929,337.

Notice of Allowability mailed from the Unites States Patent and Trademark Office on Apr. 11, 2013 in the related U.S. Appl. No. 12/929,337.

Communication mailed from the Unites States Patent and Trademark Office on Apr. 23, 2012 in the related U.S. Appl. No. 12/929,337.

U.S. Appl. No. 12/929,337, filed Jan. 14, 2011, Viatcheslav Smirnov et al. Samsung Electromechanics, Co., Ltd.

Chinese Office Action issue on Sep. 30, 2013 in corresponding Chinese Patent Application No. 201110051085.2.

MOTOR HAVING A DISK SUPPORT MEMBER WITH AIR FLOW PATH PORTIONS AND A DISK DRIVE DEVICE HAVING THE SAME

CROSS-REFERENCE TO RELATED APPLICATIONS

This application is a continuation of and claims priority benefit to U.S. patent application Ser. No. 12/929,337, filed Jan. 14, 2011, which issued as U.S. Pat. No. 8,448,202 on May 21, 2013, which in turn claims priority benefit from Korean Patent Application No. 10-2010-0068910 filed on Jul. 16, 2010, in the Korean Intellectual Property Office, the entire contents of which are incorporated herein by reference.

BACKGROUND

1. Field

The present invention relates to a motor and a disk drive device having the same, and more particularly, to a motor having a disk support member formed on an upper surface of a rotor case to support a bottom surface of a disk mounted thereon, and a disk drive device having the same.

2. Description of the Related Art

In general, a spindle motor, installed inside an optical disk drive, rotates a disk so that an optical pick-up device can read data recorded on the disk.

The spindle motor may have a rotor case mounted on a shaft rotatably supported by a sleeve, and a disk support member mounted on an upper surface of the rotor case. The disk support member supports the disk by contacting a bottom surface of the disk at the time of the mounting of the disk.

Meanwhile, in the case in which the disk is mounted on the spindle motor and rotating, a pressure differential occurs between a central portion of the disk and a peripheral portion thereof. Further, a temperature differential occurs between the central portion of the disk and the peripheral portion thereof since various heat sources may be disposed under the rotor case.

Due to the pressure differential and the temperature differential, vibrations may be generated during the rotation driving of the disk. Accordingly, the power consumption of the motor may increase.

In addition, the generation of the vibrations leads to an increase in settling time of the driven motor and required time before high-speed rotations thereof, and the temperature of internal components increases to thereby deteriorate durability.

Furthermore, the vibrations also lead to an increase in noise.

SUMMARY

An aspect of the present invention provides a motor achieving a reduction in power consumption by reducing a pressure differential and a temperature differential occurring during the rotation driving of a disk, and a disk drive device having the same.

According to an aspect of the present invention, there is provided a motor including: a rotor case having a chucking device, on which a disk is mounted, press-fitted and coupled thereto; and disk support members mounted on an upper surface of the rotor case to support a bottom surface of the disk, and having each of flow path portions therebetween allowing for airflow in a space between the disk and the rotor case, wherein a push portion is disposed in at least one of the rotor case and the disk support members to accelerate the airflow through the flow path portions when the rotor case rotates.

The push portion may include a plurality of recesses spaced apart from each other in the upper surface of the rotor case in a circumferential direction thereof.

The plurality of recesses may be spaced apart from each other in the circumferential direction and disposed inwardly of the flow path portions provided between the disk support members so as to correspond to the flow path portions.

The plurality of recesses may be disposed inwardly of the disk support members in a radial direction while being individually disposed between the flow path portions spaced apart from each other.

The push portion may include a first push portion disposed in the upper surface of the rotor case and a second push portion disposed in at least one of an inner circumferential surface and an outer circumferential surface of a corresponding one of the disk support members.

The first push portion may include a plurality of recesses spaced apart from each other in the upper surface of the rotor case in the circumferential direction thereof, and the second push portion may include a concave recess disposed in the outer circumferential surface of the corresponding disk support member.

The first push portion may include a plurality of recesses spaced apart from each other in the upper surface of the rotor case in the circumferential direction thereof, and the second push portion may include a concave recess disposed in the outer circumferential surface of the corresponding disk support member and a protrusion disposed on the inner circumferential surface of the corresponding disk support member The first push portion may include a plurality of recesses spaced apart from each other in the upper surface of the rotor case in the circumferential direction thereof, and the second push portion may include an outer concave recess disposed in the outer circumferential surface of the corresponding disk support member and an inner concave recess disposed in the inner circumferential surface of the corresponding disk support member.

The outer and inner concave recesses may alternate with each other.

The first push portion may be disposed inwardly of the corresponding disk support member in a radial direction so as to correspond to the inner concave recess of the second push portion.

The push portion may include a protrusion disposed on an inner circumferential surface of a corresponding one of the disk support members.

The push portion may include a concave recess disposed in an inner circumferential surface of a corresponding one of the disk support members.

The flow path portions may be slanted with respect to a radial direction.

According to another aspect of the present invention, there is provided a disk drive device including: a housing having an opening allowing a disk to be taken in or out therethrough; the motor mounted in the housing as described above; an optical pick-up unit irradiating light onto the disk rotated by the motor and receiving reflected light therefrom; and a driving unit moving the optical pick-up unit in a circumferential direction of the disk.

BRIEF DESCRIPTION OF THE DRAWINGS

The above and other aspects, features and other advantages of the present invention will be more clearly understood from the following detailed description taken in conjunction with the accompanying drawings, in which.

DESCRIPTION OF EMBODIMENTS

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Moreover, detailed descriptions related to well-known functions or configurations will be ruled out in order not to unnecessarily obscure subject matters of the present invention.

Figure 1:
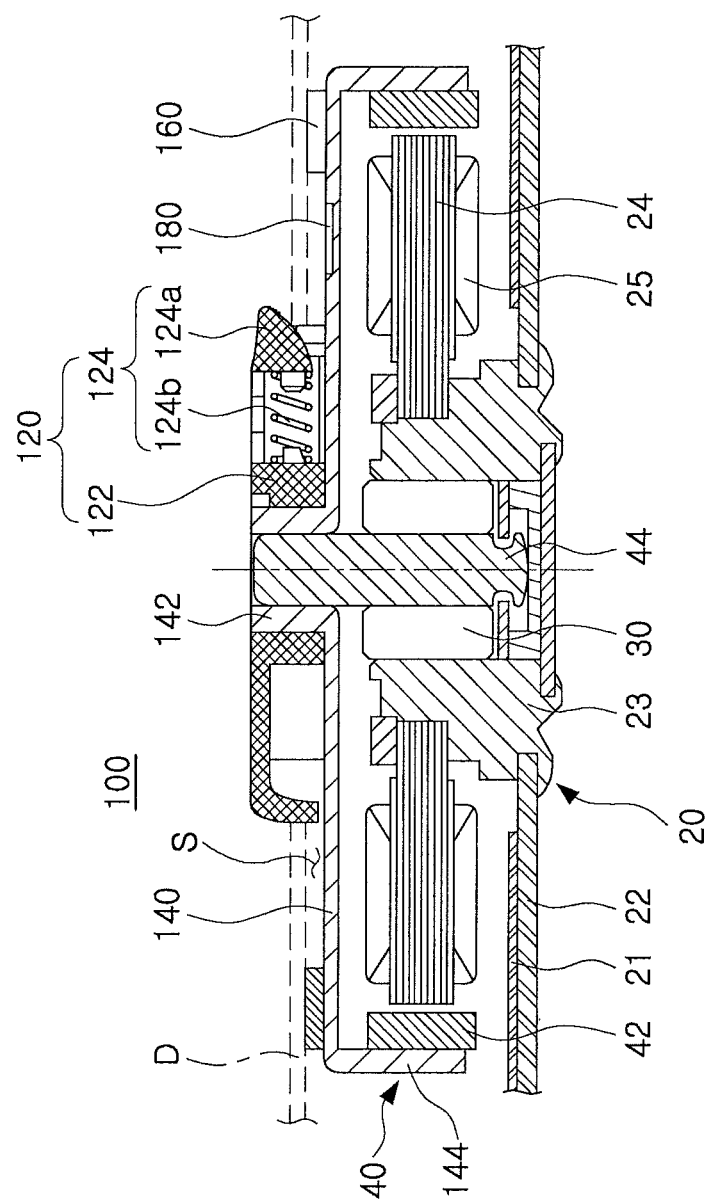
FIG. 1 is a schematic cross-sectional view illustrating a motor according to a first exemplary embodiment of the present invention.
Figure 2A:
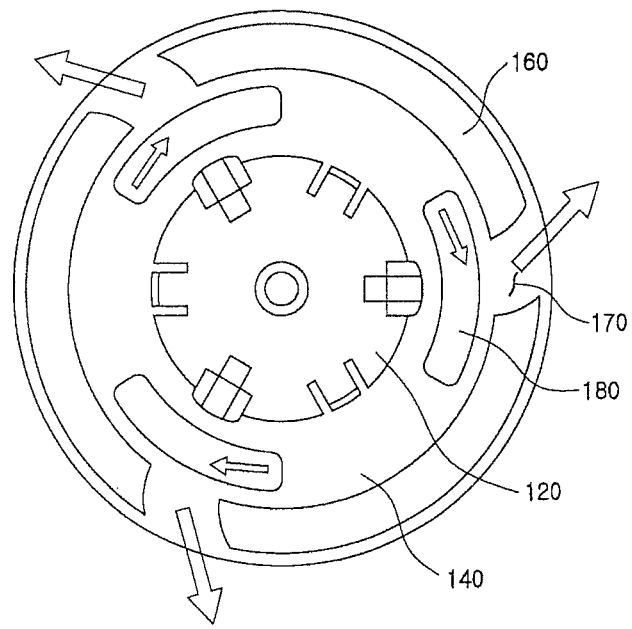
FIG. 2A is a plan view illustrating the motor according to the first exemplary embodiment of the present invention.
Figure 2B:
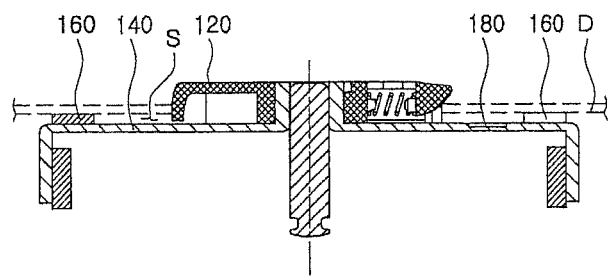
FIG. 2B is a schematic cross-sectional view illustrating the motor according to the first exemplary embodiment of the present invention.
Figure 3:
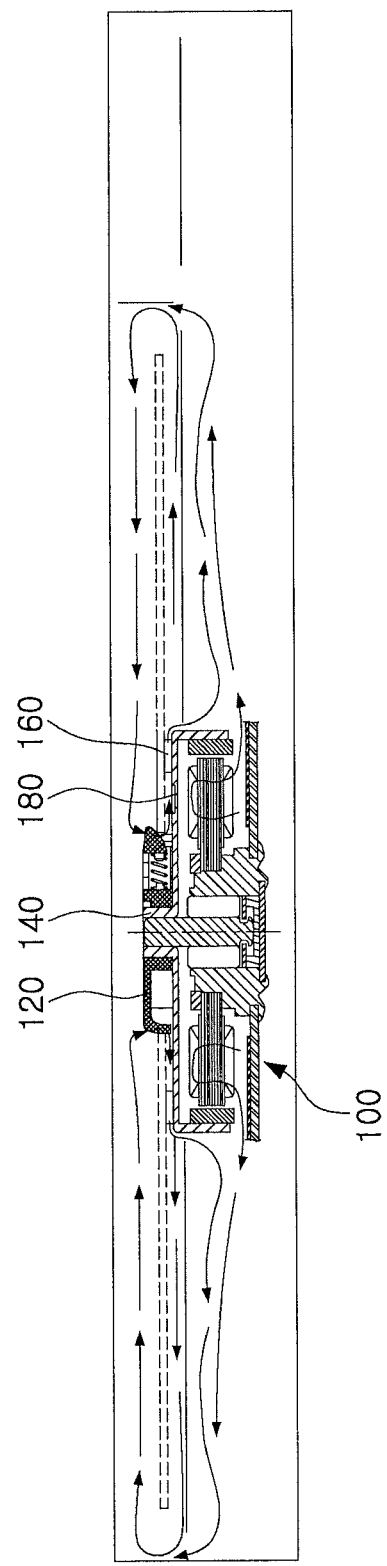
FIG. 3 is a schematic view illustrating airflow occurring during the driving of the motor according to the first exemplary embodiment of the present invention.

FIG. 1 is a schematic cross-sectional view illustrating a motor according to a first exemplary embodiment of the present invention. FIG. 2A is a plan view illustrating the motor according to the first exemplary embodiment of the present invention. FIG. 2B is a schematic cross-sectional view illustrating the motor according to the first exemplary embodiment of the present invention. FIG. 3 is a schematic view illustrating airflow occurring during the driving of the motor according to the first exemplary embodiment of the present invention.

With reference to FIGS. 1 through 3, a motor 100 according to the first exemplary embodiment of the invention motor 100 includes a chucking device 120, a rotor case 140, disk support members 160, and push portions 180.

Here, the motor 100 is a spindle motor that is applied to a disk drive device rotating a disk D, and includes a stator 20 and a rotor 40.

The stator 20 is constituted of stationary parts except for rotating parts. The stator 20 includes a base plate 22, a sleeve holder 23, a stator core 24 and a winding coil 25. A printed circuit board (PCB) 21 is mounted on the base plate 22. The sleeve holder 23 supports a sleeve 30 by the press-fitting of the sleeve 30 thereto. The stator core 24 is fixed to the sleeve holder 23. The winding coil 25 is wound around the stator core 24.

The rotor 40 includes a rotor case 140 having a cup shape. The rotor case 140 has an annular magnet 42 on its inner circumferential portion, and the magnet 42 corresponds to the stator core 24. Here, the magnet 42 is a permanent magnet that has north and south magnetic poles magnetized alternately in a circumferential direction to thereby generate a predetermined level of magnetic force.

The rotor case 140 includes a rotor hub 142 being press-fitted and coupled to a shaft 44 and a magnet coupling portion 144 having the annular magnet 42 disposed on an inner circumferential surface thereof.

The rotor hub 142 is bent upwardly in an axial direction of the shaft 44 in order to maintain un-mating force with the shaft 44. The chucking device 120 for the mounting of the disk D is coupled to an outer circumferential surface of the rotor hub 142.

The magnet 42, provided along the inner circumferential surface of the magnet coupling portion 144, is disposed to face the winding coil 25. Electromagnetic interaction between the magnet 42 and the winding coil 25 induces the rotation of the rotor 40. In order words, when the rotor case 140 rotates, the shaft 44 interlocked with the rotor case 140 rotates.

Meanwhile, terms used herein associated with directions will now be defined. As viewed in FIG. 1, the axial direction refers to a vertical direction on the basis of the shaft 44; a radial direction refers to a direction towards the outer edge of the rotor case 140 on the basis of the shaft 44 or a central direction of the shaft 44 on the basis of the outer edge of the rotor case 140; and the circumferential direction refers to a direction of rotation along an outer circumferential surface of the shaft 44.

The chucking device 120 serves to fasten the disk D mounted thereon. For the mounting of the disk D, the chucking device 120 includes a center case 122 press-fitted to the rotor case 140 and a chucking unit 124 installed in the center case 122.

Also, the chucking unit 124 includes a chuck chip 124*a* and elastic members 124*b*. The chuck chip 124*a* is elastically supported by the elastic members 124*b* in the radial direction. Accordingly, the chuck chip 124*a* is capable of a sliding movement, thereby allowing the disk D to be fixed.

As described above, the chucking device 120 for the mounting of the disk D is press-fitted and coupled to the rotor case 140.

Meanwhile, the disk support members 160 are mounted on an upper surface of the rotor case 140 to support a bottom surface of the disk D. Flow path portions 170 are formed to allow air to flow inwardly and outwardly of a space S between the disk D and the rotor case 140.

That is, the plurality of disk support members 160 are spaced apart from each other along the outer edge of the upper surface of the rotor case 140 in the circumferential direction, thereby forming the flow path portions 170 allowing the air to flow inwardly and outwardly of the space S.

Also, the flow path portions 170 may be slanted with respect to the radial direction so as to allow the air to more smoothly flow outward from the space S while the rotor case 140 is rotating.

Meanwhile, with regard to the airflow through the flow path portions 170 as shown in FIG. 3, the air flows from an upper portion of the chucking device 120 into the space S formed by the rotor case 140, the disk support members 160 and the bottom surface of the disk D, and then the air flows from the space S towards the outside of the space S through the flow path portions 170.

Accordingly, a pressure differential and a temperature differential between the space S, formed by the rotor case 140, the disk support members 160 and the bottom surface of the disk D, and the outside of the space S may be reduced, whereby vibrations, noise or the like caused by the pressure differential and the temperature differential may be reduced.

Also, a reduction in the pressure differential and the temperature differential between the space S, formed by the rotor case 140, the disk support members 160 and the bottom surface of the disk D, and the outside of the space S may result in a reduction in the power consumption of the motor 100.

The push portions 180 may be formed in at least one of the rotor case 140 and the disk support members 160 and accelerate the airflow through the flow path portions 170 when the rotor case 140 rotates.

Meanwhile, the push portions 180 according to this embodiment may be a plurality of recesses spaced apart from each other in the upper surface of the rotor case 140 in the circumferential direction.

The push portions 180 are disposed inwardly of the disk support members 160 in the radial direction so as to correspond to the flow path portions 170. The push portions 180 allow the air to smoothly flow from the space S towards the outside of the space S through the flow path portions 170.

Accordingly, the pressure differential and the temperature differential between the space S, formed by the rotor case 140, the disk support members 160 and the bottom surface of the disk D, and the outside of the space S may be reduced more rapidly.

As described above, the space S between the disk D and the rotor case 140 communicates with the outside of the space S through the flow path portions 170, and this allows the air to flow therethrough, thereby reducing the pressure differential and the temperature differential between the space S and the outside of the space S.

Furthermore, the push portions 180 promote a smoother airflow through the flow path portions 170, thereby reducing the pressure differential and the temperature differential between the space S and the outside of the space S more rapidly.

Accordingly, vibrations, generated while the disk D is rotating, may be reduced. As a result, the power consumption of the motor 100 may be reduced.

Hereinafter, motors according to other exemplary embodiments of the invention will be described with reference to the accompanying drawings. However, a detailed description of the same features as those described in the previous embodiment will be omitted.

Figure 4A:
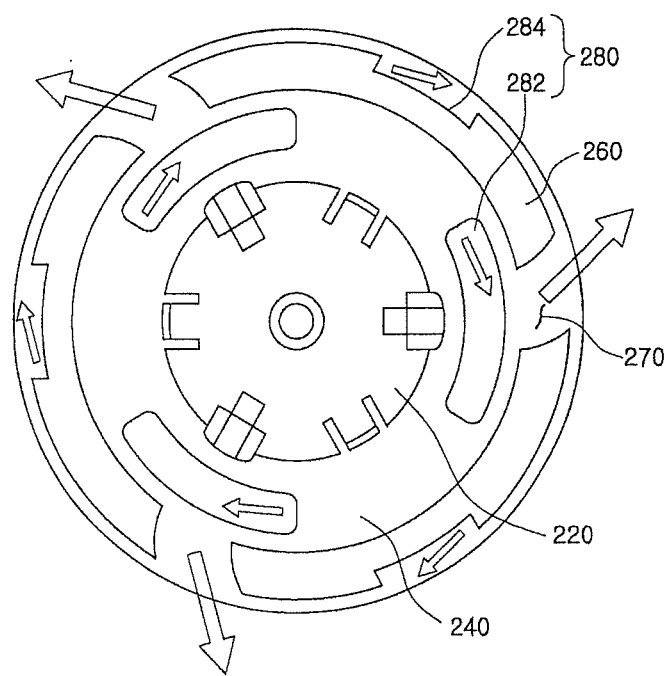
FIG. 4A is a plan view illustrating the motor according to a second exemplary embodiment of the present invention.
Figure 4B:
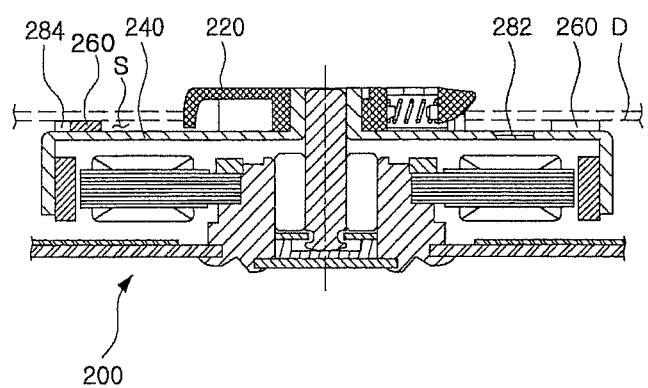
FIG. 4B is a schematic cross-sectional view illustrating a motor according to the second exemplary embodiment of the present invention.

FIG. 4A a plan view illustrating the motor according to a second exemplary embodiment of the present invention. FIG. 4B is a schematic cross-sectional view illustrating a motor according to the second exemplary embodiment of the present invention.

With reference to FIGS. 4A and 4B, a motor 200 according to the second exemplary embodiment of the invention include is a chucking device 220, a rotor case 240, disk support members 260, and push portions 280.

Meanwhile, the chucking device 220 is the same as the chucking device 120 described in the first exemplary embodiment, so a detailed description thereof will be omitted.

The chucking device 220 for the mounting of a disk D is press-fitted and coupled to an upper portion of the rotor case 240.

Meanwhile, the disk support members 260 are mounted on an upper surface of the rotor case 240 to support a bottom surface of the disk D. Flow path portions 270 are formed to allow air to flow inwardly and outwardly of a space S between the disk D and the rotor case 240.

That is, the air flows from the space S towards the outside of the space S through the flow path portions 270.

Also, the flow path portions 270 may be slanted with respect to the radial direction so as to allow the air to smoothly flow outward from the space S while the rotor case 240 is rotating.

Accordingly, a pressure differential and a temperature differential between the space S, formed by the rotor case 240, the disk support members 260 and the bottom surface of the disk D, and the outside of the space S may be reduced, whereby vibrations, noise or the like caused by the pressure differential and the temperature differential may be reduced.

Also, a reduction in the pressure differential and the temperature differential between the space S, formed by the rotor case 240, the disk support members 260 and the bottom surface of the disk D, and the outside of the space S may result in a reduction in the power consumption of the motor 200.

The push portions 280 may be formed in at least one of the rotor case 240 and the disk support members 260 and accelerate the airflow through the flow path portions 270 when the rotor case 240 rotates.

That is, the push portions 280 may include first push portions 282 formed in the upper surface of the rotor case 240 and second push portions 284 each formed in at least one of an inner circumferential surface and an outer circumferential surface of a corresponding one of the disk support members 260.

Meanwhile, according to the present embodiment, the first push portions 282 may be a plurality of recesses spaced apart from each other in the upper surface of the rotor case 240 in the circumferential direction, and the second push portions 284 may be concave recesses formed in the outer circumferential surfaces of the disk support members 260, respectively.

The first and second push portions 282 and 284 will now be described in greater detail.

The first push portions 282 are disposed inwardly of the disk support members 260 in the radial direction so as to correspond to the flow path portions 270 such that they allow the air to smoothly flow from the space S towards the outside of the space S through the flow path portions 270.

Accordingly, the pressure differential and the temperature differential between the space S, formed by the rotor case 240, the disk support members 260 and the bottom surface of the disk D, and the outside of the space S may be reduced more rapidly.

Meanwhile, the second push portions 284 are disposed in respective central portions of the outer circumferential surfaces of the disk support members 260 such that they serve to accelerate the airflow at the outside of the space S. Accordingly, the air may flow more smoothly from the space S towards the outside of the space S through the flow path portions 270.

As a result, the second push portions 284 may serve to reduce the pressure differential and the temperature differential between the space S, formed by the rotor case 240, the disk support members 260 and the bottom surface of the disk D, and the outside of the space S more rapidly.

As described above, the space S between the disk D and the rotor case 240 communicates with the outside of the space S through the flow path portions 270, and this allows the air to flow therethrough, thereby reducing the pressure differential and the temperature differential between the space S and the outside of the space S.

Furthermore, the push portions 280, including the first and second push portions 282 and 284, promote a smoother airflow through the flow path portions 270, thereby reducing the pressure differential and the temperature differential between the space S and the outside of space S more rapidly.

Accordingly, vibrations, generated while the disk D is rotating, may be reduced. As a result, the power consumption of the motor 200 may be reduced.

Figure 5A:
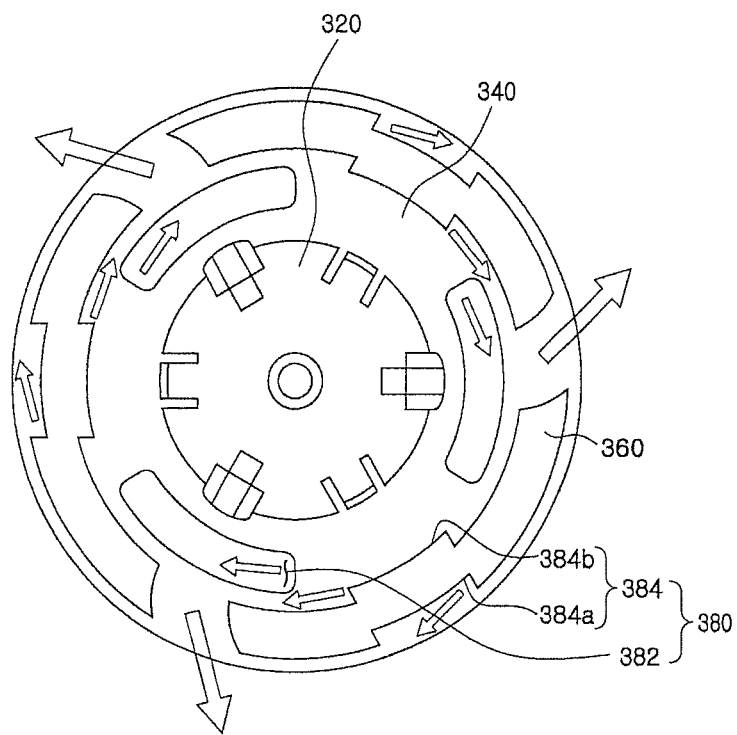
FIG. 5A is a plan view illustrating a motor according to a third exemplary embodiment of the present invention.
Figure 5B:
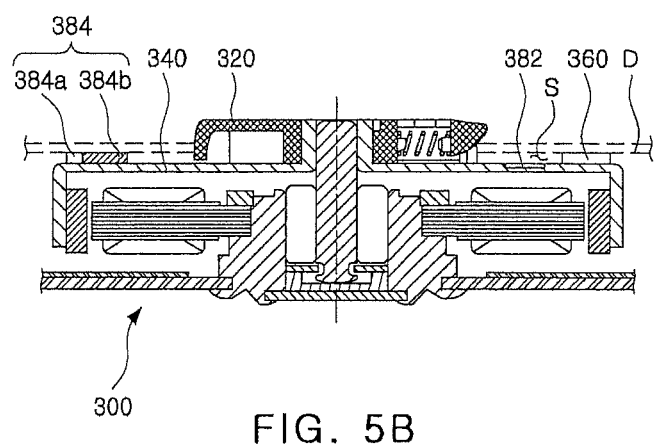
FIG. 5B is a schematic cross-sectional view illustrating a motor according to the third exemplary embodiment of the present invention.

FIG. 5A is a plan view illustrating a motor according to a third exemplary embodiment of the present invention. FIG. 5B is a schematic cross-sectional view illustrating a motor according to the third exemplary embodiment of the present invention.

With reference to FIGS. 5A and 5B, a motor 300 according to the third exemplary embodiment of the invention includes a chucking device 320, a rotor case 340, disk support members 360, and push portions 380.

Meanwhile, the chucking device 320, the rotor case 340 and the disk support members 360 are configured in the same manner as the chucking device 120, the rotor case 140 and the disk support members 160 of the motor 100 according to the first exemplary embodiment of the invention as described above, so a detailed description thereof will be omitted.

Meanwhile, the push portions 380 may be formed in at least one of the rotor case 340 and the disk support members 360 and accelerate airflow through flow path portions 370 when the rotor case 340 rotates.

That is, the push portions 380 may include first push portions 382 formed in an upper surface of the rotor case 340 and second push portions 384 each formed in at least one of an inner circumferential surface and an outer circumferential surface of a corresponding one of the disk support members 360.

Meanwhile, according to the present embodiment, the first push portions 382 may be a plurality of recesses spaced apart from each other in the upper surface of the rotor case 340 in the circumferential direction, and each of the second push portions 384 may include a concave recess 384a formed in an outer circumferential surface of a corresponding one of the disk support members 360 and a protrusion 384b formed on an inner circumferential surface of the corresponding one of the disk support members 360.

The first and second push portions 382 and 384 will now be described in greater detail.

The first push portions 382 are disposed inwardly of the disk support members 360 in the radial direction so as to correspond to the flow path portions 370 such that they allow air to smoothly flow from a space S between a disk D and the rotor case 340 towards the outside of the space S through the flow path portions 370.

Accordingly, a pressure differential and a temperature differential between the space S, formed by the rotor case 340, the disk support members 360 and a bottom surface of the disk D, and the outside of the space S may be reduced more rapidly.

Meanwhile, each of the second push portions 384 includes the concave recess 384a and the protrusion 384b. The concave recess 384a is disposed in a central portion of the outer circumferential surface of the corresponding disk support member 360 to accelerate the airflow at the outside of the space S. The protrusion 384b is disposed on a central portion of the inner circumferential surface of the corresponding disk support member 360 to serve, together with the first push portions 382, to accelerate the airflow from the space S towards the outside of the space S.

Accordingly, the concave recess 384a may serve to accelerate the airflow at the outside of the space S, while the protrusion 384b may serve to accelerate the airflow from the space S towards the outside of the space S through the flow path portions 370.

As a result, the second push portions 384 may accelerate the airflow inwardly and outwardly of the space S, thereby smoothing the airflow.

As described above, the space S between the disk D and the rotor case 340 communicates with the outside of the space S through the flow path portions 370, and this allows the air to flow therethrough, thereby reducing the pressure differential and the temperature differential between the space S and the outside of the space S.

Furthermore, the push portions 380, including the first and second push portions 382 and 384, promote a smoother airflow through the flow path portions 370, thereby reducing the pressure differential and the temperature differential between the space S and the outside of the space S more rapidly.

Accordingly, vibrations, generated while the disk D is rotating, may be reduced. As a result, the power consumption of the motor 300 may be reduced.

Figure 6A:
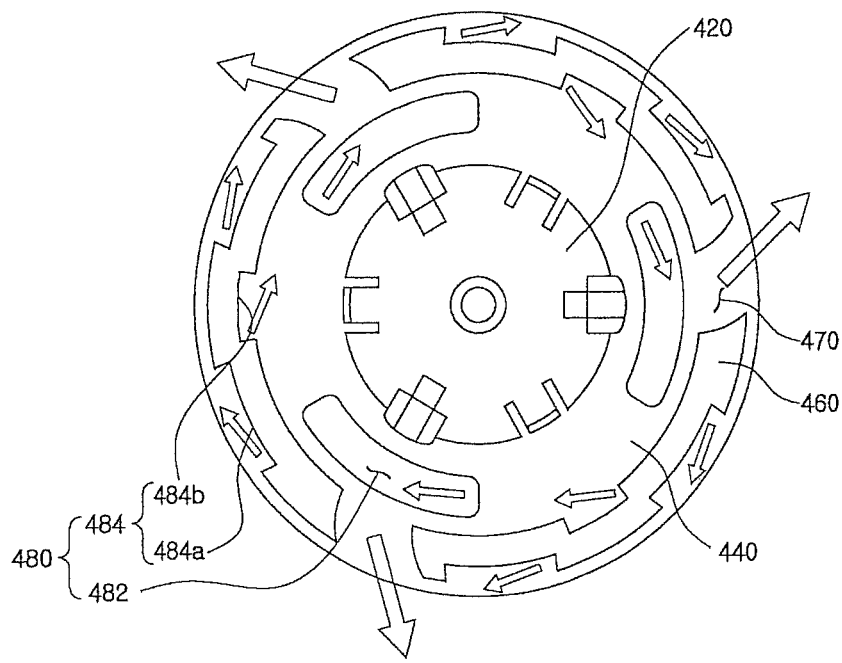
FIG. 6A is a plan view illustrating a motor according to a fourth exemplary embodiment of the present invention.
Figure 6B:
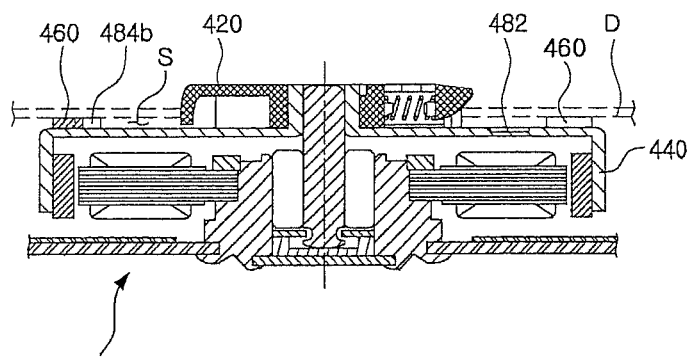
FIG. 6B is a schematic cross-sectional view illustrating a motor according to the fourth exemplary embodiment of the present invention.

FIG. 6A is a plan view illustrating a motor according to a fourth exemplary embodiment of the present invention. FIG. 6B is a schematic cross-sectional view illustrating a motor according to the fourth exemplary embodiment of the present invention.

With reference to FIGS. 6A and 6B, a motor 400 according to the fourth exemplary embodiment of the invention includes a chucking device 420, a rotor case 440, disk support members 460, and push portions 480.

Meanwhile, the chucking device 420, the rotor case 440 and the disk support members 460 are configured in the same manner as the chucking device 120, the rotor case 140 and the disk support members 160 of the motor 100 according to the first exemplary embodiment of the invention as described above, so a detailed description thereof will be omitted.

Meanwhile, the push portions 480 may be formed in at least one of the rotor case 440 and the disk support members 460 and accelerate airflow through flow path portions 470 when the rotor case 440 rotates.

That is, the push portions 480 may include first push portions 482 formed in an upper surface of the rotor case 440 and second push portions 484 each formed in at least one of an inner circumferential surface and an outer circumferential surface of a corresponding one of the disk support members 460.

Meanwhile, according to the present embodiment, the first push portions 482 may be a plurality of recesses spaced apart from each other in the upper surface of the rotor case 440 in the circumferential direction, and each of the second push portions 484 may include outer concave recesses 484a formed in an outer circumferential surface of a corresponding one of the disk support members 460 and an inner concave recess 484b formed in an inner circumferential surface of the corresponding one of the disk support members 460.

Also, the outer and inner concave recesses 484a and 484b may be alternately disposed in the disk support members 460.

The first and second push portions 482 and 484 will now be described in greater detail.

The first push portions 482 are disposed inwardly of the disk support members 460 in the radial direction so as to correspond to the flow path portions 470 such that they allow air to smoothly flow from a space S between a disk D and the rotor case 440 towards the outside of the space S through the flow path portions 470.

Accordingly, a pressure differential and a temperature differential between the space S, formed by the rotor case 440, the disk support members 460 and the bottom surface of the disk D, and the outside of the space S may be reduced more rapidly.

Meanwhile, each of the second push portions 484 includes the outer concave recesses 484a and the inner concave recess 484b. The outer concave recesses 484a are spaced apart from each other in the outer circumferential surface of the corresponding disk support member 460 to accelerate the airflow at the outside of the space S. The inner concave recess 484b is disposed in a central portion of the inner circumferential surface of the corresponding disk support member 460 to serve, together with the first push portions 482, to accelerate the airflow from the space S towards the outside of the space S.

Accordingly, the outer concave recesses 484a may serve to accelerate the airflow at the outside of the space S, while the inner concave recess 484b may serve to accelerate the airflow from the space S towards the outside of the space S through the flow path portions 470.

As a result, the second push portions 484 may accelerate the airflow inwardly and outwardly of the space S, thereby smoothing the airflow.

As described above, the space S between the disk D and the rotor case 440 communicates with the outside of the space S through the flow path portions 470, and this allows the air to flow therethrough, thereby reducing the pressure differential and the temperature differential between the space S and the outside of the space S.

Furthermore, the push portions 480, including the first and second push portions 482 and 484, promote a smoother airflow through the flow path portions 470, thereby reducing the pressure differential and the temperature differential between the space S and the outside of the space S more rapidly.

Accordingly, vibrations, generated while the disk D is rotating, may be reduced. As a result, the power consumption of the motor 400 may be reduced.

Figure 7A:
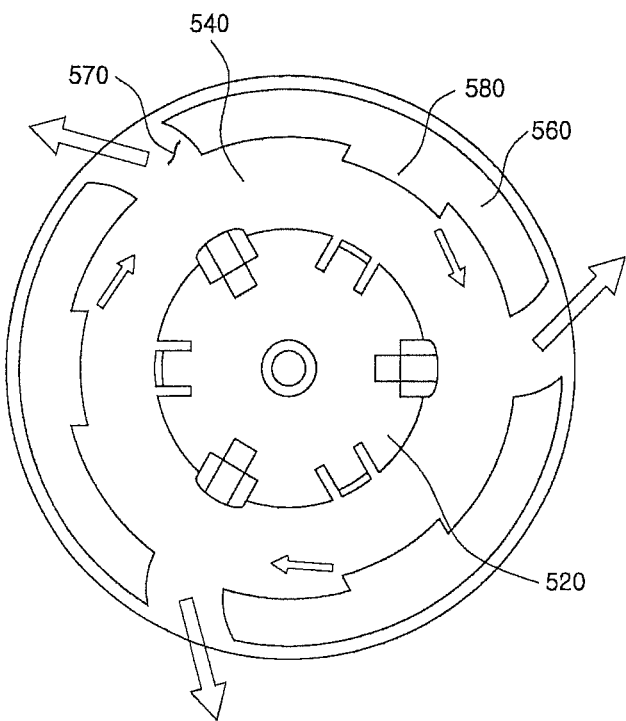
FIG. 7A is a plan view illustrating a motor according to a fifth exemplary embodiment of the present invention.
Figure 7B:
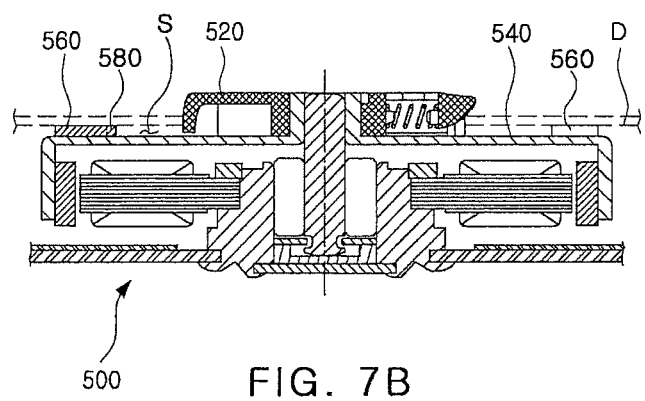
FIG. 7B is a schematic cross-sectional view illustrating a motor according to the fifth exemplary embodiment of the present invention.

FIG. 7A is a plan view illustrating a motor according to a fifth exemplary embodiment of the present invention. FIG. 7B is a schematic cross-sectional view illustrating a motor according to the fifth exemplary embodiment of the present invention.

With reference to FIGS. 7A and 7B, a motor 500 according to the fifth exemplary embodiment of the invention includes a chucking device 520, a rotor case 540, disk support members 560, and push portions 580.

Meanwhile, the chucking device 520, the rotor case 540 and the disk support members 560 are configured in the same manner as the chucking device 120, the rotor case 140 and the disk support members 160 of the motor 100 according to the first exemplary embodiment of the invention as described above, so a detailed description thereof will be omitted.

Meanwhile, the push portions 580 may be formed in at least one of the rotor case 540 and the disk support members 560 and accelerate airflow through flow path portions 570 when the rotor case 540 rotates.

Meanwhile, the push portions 580 according to the present embodiment may be protrusions formed on inner circumferential surfaces of the disk support members 560, respectively.

The push portions 580 are disposed on respective central portions of the inner circumferential surfaces of the disk support members 560 such that they allow air to smoothly flow from a space S between a disk D and the rotor case 540 towards the outside of the space S through the flow path portions 570.

Accordingly, a pressure differential and a temperature differential between the space S, formed by the rotor case 540, the disk support members 560 and the bottom surface of the disk D, and the outside of the space S may be reduced more rapidly.

As described above, the space S between the disk D and the rotor case 540 communicates with the outside of the space S through the flow path portions 570, and this allows the air to flow therethrough, thereby reducing the pressure differential and the temperature differential between the space S and the outside of the space S.

Furthermore, the push portions 580 promote a smoother airflow through the flow path portions 570, thereby reducing the pressure differential and the temperature differential between the space S and the outside of the space S more rapidly.

Accordingly, vibrations, generated while the disk D is rotating, may be reduced. As a result, the power consumption of the motor 500 may be reduced.

Figure 8A:
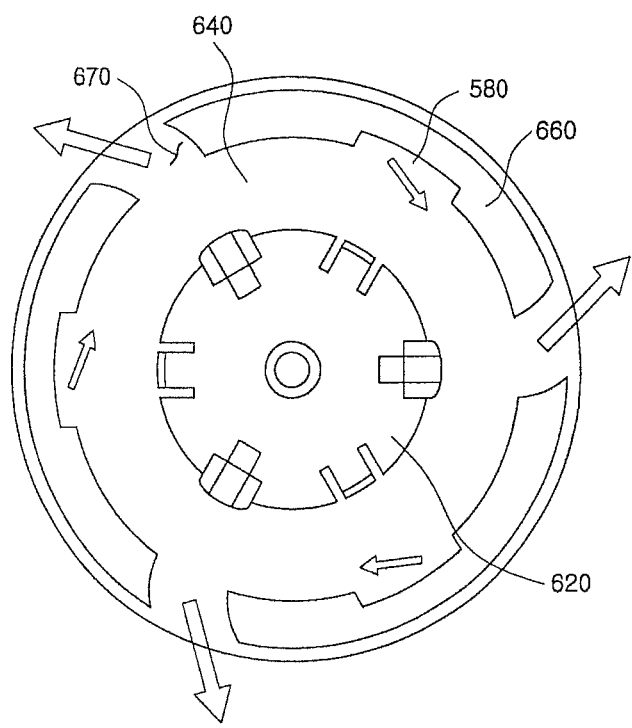
FIG. 8A is a plan view illustrating a motor according to a sixth exemplary embodiment of the present invention.
Figure 8B:
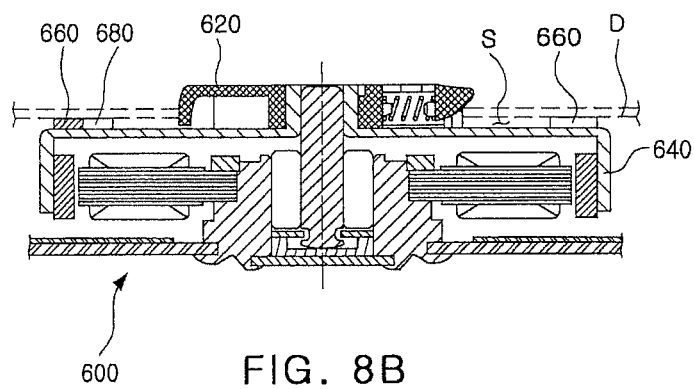
FIG. 8B is a schematic cross-sectional view illustrating a motor according to the sixth exemplary embodiment of the present invention.

FIG. 8A is a plan view illustrating a motor according to a sixth exemplary embodiment of the present invention. FIG. 8B is a schematic cross-sectional view illustrating a motor according to the sixth exemplary embodiment of the present invention.

With reference to FIGS. 8A and 8B, a motor 600 according to the sixth exemplary embodiment of the invention includes a chucking device 620, a rotor case 640, disk support members 660, and push portions 680.

Meanwhile, the chucking device 620, the rotor case 640 and the disk support members 660 are configured in the same manner as the chucking device 120, the rotor case 140 and the disk support members 160 of the motor 100 according to the first exemplary embodiment of the invention as described above, so a detailed description thereof will be omitted.

Meanwhile, the push portions 680 may be formed in at least one of the rotor case 640 and the disk support members 660 and accelerate airflow through flow path portions 670 when the rotor case 640 rotates.

Meanwhile, the push portions 680 according to the present embodiment may be concave recesses formed in inner circumferential surfaces of the disk support members 660, respectively.

The push portions 680 are disposed in respective central portions of the inner circumferential surfaces of the disk support members 660 such that they allow air to smoothly flow from a space S between a disk D and the rotor case 640 towards the outside of the space S through the flow path portions 670.

Accordingly, a pressure differential and a temperature differential between the space S, formed by the rotor case 640, the disk support members 660 and the bottom surface of the disk D, and the outside of the space S may be reduced more rapidly.

As described above, the space S between the disk D and the rotor case 640 communicates with the outside of the space S through the flow path portions 670, and this allows the air to flow therethrough, thereby reducing the pressure differential and the temperature differential between the space S and the outside of the space S.

Furthermore, the push portions 680 promote a smoother airflow through the flow path portions 670, thereby reducing the pressure differential and the temperature differential between the space S and the outside of the space S more rapidly.

Accordingly, vibrations, generated while the disk D is rotating, may be reduced. As a result, the power consumption of the motor 600 may be reduced.

Figure 9A:
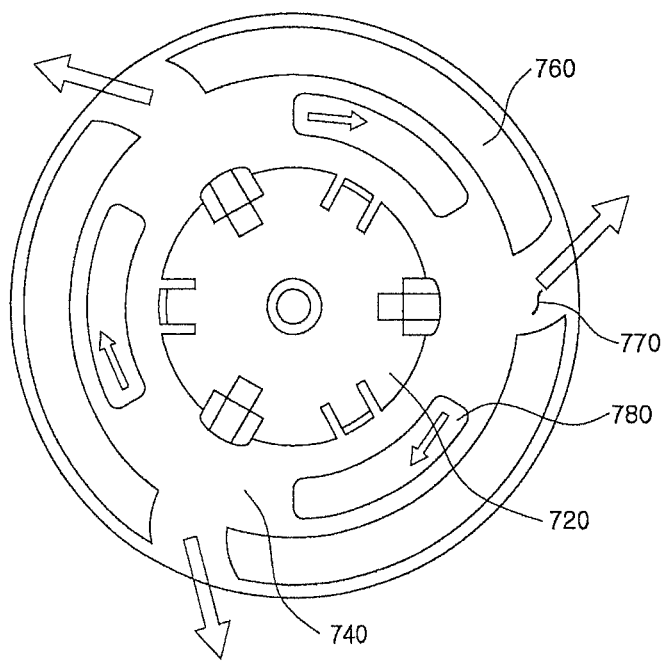
FIG. 9A is a plan view illustrating a motor according to a seventh exemplary embodiment of the present invention.
Figure 9B:
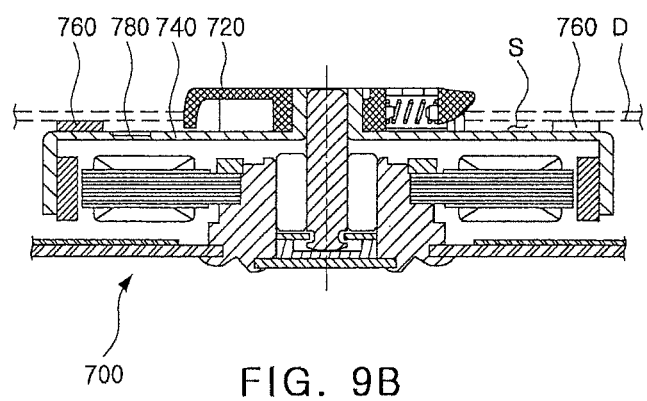
FIG. 9B is a schematic cross-sectional view illustrating a motor according to the seventh exemplary embodiment of the present invention.

FIG. 9A is a plan view illustrating a motor according to a seventh exemplary embodiment of the present invention. FIG. 9B is a schematic cross-sectional view illustrating a motor according to the seventh exemplary embodiment of the present invention.

With reference to FIGS. 9A and 9B, a motor 700 according to the seventh exemplary embodiment of the invention includes a chucking device 720, a rotor case 740, disk support members 760, and push portions 780.

Meanwhile, the chucking device 720, the rotor case 740 and the disk support members 760 are configured in the same manner as the chucking device 120, the rotor case 140 and the disk support members 160 of the motor 100 according to the first exemplary embodiment of the invention as described above, so a detailed description thereof will be omitted.

Meanwhile, the push portions 780 may be formed in at least one of the rotor case 740 and the disk support members 760 and accelerate airflow through flow path portions 770 when the rotor case 740 rotates.

Meanwhile, the push portions 780 according to this embodiment may be a plurality of recesses spaced apart from each other in an upper surface of the rotor case 740 in the circumferential direction.

The push portions 780 are disposed inwardly of the disk support members 760 in the radial direction while being individually disposed between the flow path portions 770 spaced apart from each other.

That is, each of the push portions 780 is disposed between adjacent flow path portion s 770 to guide air towards the flow path portions 770.

In order wards, the push portions 780 allow the air to smoothly flow from a space S between a disk D and the rotor case 740 towards the outside of the space S through the flow path portions 770.

Accordingly, a pressure differential and a temperature differential between the space S, formed by the rotor case 740, the disk support members 760 and the bottom surface of the disk D, and the outside of the space S may be reduced more rapidly.

As described above, the space S between the disk D and the rotor case 740 communicates with the outside of the space S through the flow path portions 770, and this allows the air to flow therethrough, thereby reducing the pressure differential and the temperature differential between the space S and the outside of the space S.

Furthermore, the push portions 780 promote a smoother airflow through the flow path portions 770, thereby reducing the pressure differential and the temperature differential between the space S and the outside of the space S more rapidly.

Accordingly, vibrations, generated while the disk D is rotating, may be reduced. As a result, the power consumption of the motor 700 may be reduced.

Figure 10A:
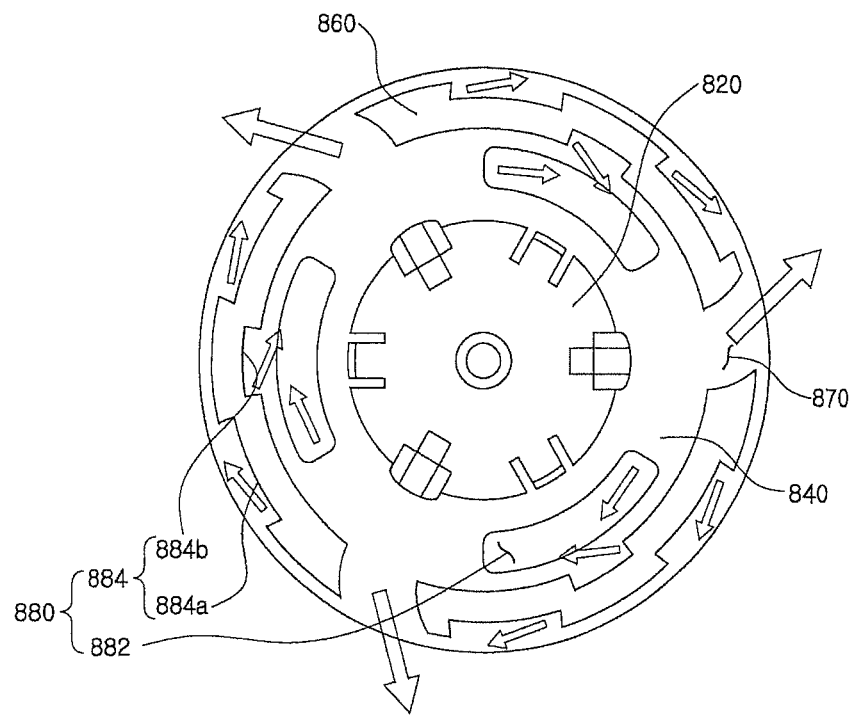
FIG. 10A is a plan view illustrating a motor according to an eighth exemplary embodiment of the present invention.
Figure 10B:
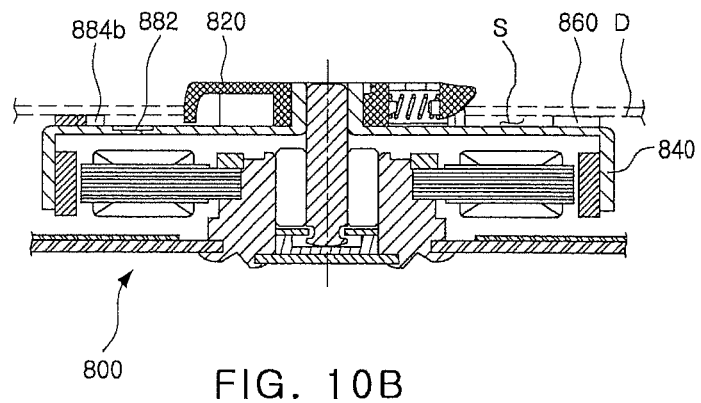
FIG. 10B is a schematic cross-sectional view illustrating a motor according to the eighth exemplary embodiment of the present invention.

FIG. 10A is a plan view illustrating a motor according to an eighth exemplary embodiment of the present invention. FIG. 10B is a schematic cross-sectional view illustrating a motor according to the eighth exemplary embodiment of the present invention.

With reference to FIGS. 10A and 10B, a motor 800 according to the eighth exemplary embodiment of the invention includes a chucking device 820, a rotor case 840, disk support members 860, and push portions 880.

Meanwhile, the chucking device 820, the rotor case 840 and the disk support members 860 are configured in the same manner as the chucking device 120, the rotor case 140 and the disk support members 160 of the motor 100 according to the first exemplary embodiment of the invention as described above, so a detailed description thereof will be omitted.

Meanwhile, the push portions 880 may be formed in at least one of the rotor case 840 and the disk support members 860 and accelerate airflow through flow path portions 870 when the rotor case 840 rotates.

That is, the push portions 880 may include first push portions 882 formed in an upper surface of the rotor case 840, and second push portions 884 each formed in at least one of an inner circumferential surface and an outer circumferential surface of a corresponding one of the disk support members 860.

Meanwhile, according to the present embodiment, the first push portions 882 may be a plurality of recesses spaced apart from each other in the upper surface of the rotor case 840 in the circumferential direction, and each of the second push portions 884 may include outer concave recesses 884a formed in an outer circumferential surface of a corresponding one of the disk support members 860 and an inner concave recess 884b formed in an inner circumferential surface of the corresponding one of the disk support members 860.

Also, the outer and inner concave recesses 884a and 884b may be alternately disposed in the disk support members 860.

The first push portions 882 may be disposed inwardly of the disk support members 860 while each being formed in the upper surface of the rotor case 840 so as to correspond to the inner concave recess 884b.

The first and second push portions 882 and 884 will now be described in greater detail.

The first push portions 882 are disposed inwardly of the disk support members 860 in the radial direction so as to correspond to the inner concave recesses 884b such that they allow air to smoothly flow from a space S between a disk D and the rotor case 840 towards the outside of the space S through the flow path portions 870.

Accordingly, a pressure differential and a temperature differential between the space S, formed by the rotor case 840, the disk support members 860 and the bottom surface of the disk D, and the outside of the space S may be reduced more rapidly.

Meanwhile, each of the second push portions 884 includes the outer concave recesses 884a and the inner concave recess 884b. The outer concave recesses 884a are spaced apart from each other in the outer circumferential surface of the corresponding disk support member 860 to accelerate the airflow at the outside of the space S. The inner concave recess 884b is disposed in a central portion of the inner circumferential surface of the corresponding disk support member 860 to serve, together with the first push portions 882, to accelerate the airflow from the space S towards the outside of the space S.

Accordingly, the outer concave recesses 884a may serve to accelerate the airflow at the outside of the space S, while the inner concave recess 884b may serve to accelerate the airflow from the space S towards the outside of the space S through the flow path portions 870.

As a result, the second push portions 884 may accelerate the airflow inwardly and outwardly of the space S, thereby smoothing the airflow.

As described above, the space S between the disk D and the rotor case 840 communicates with the outside of the space S through the flow path portions 870, and this allows the air to flow therethrough, thereby reducing the pressure differential and the temperature differential between the space S and the outside of the space S.

Furthermore, the push portions 880, including the first and second push portions 882 and 884, promote a smoother airflow through the flow path portions 870, thereby reducing the pressure differential and the temperature differential between the space S and the outside of the space S more rapidly.

Accordingly, vibrations, generated while the disk D is rotating, may be reduced. As a result, the power consumption of the motor 800 may be reduced.

Figure 11:
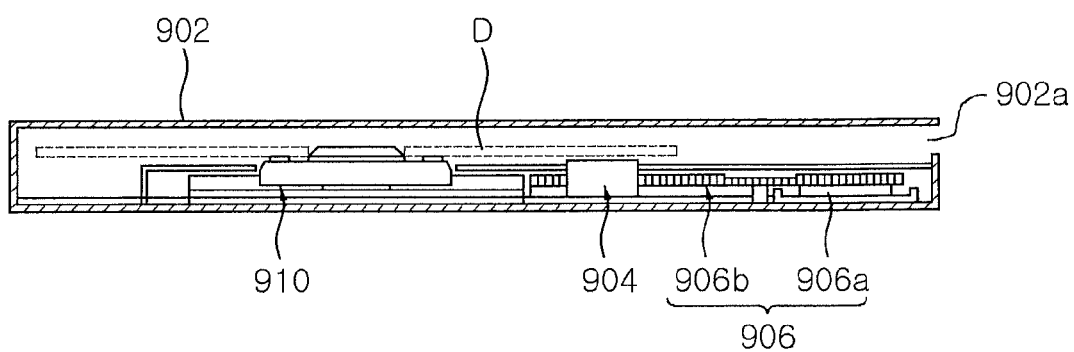
FIG. 11 is a schematic cross-sectional view illustrating a disk drive device according to the first exemplary embodiment of the present invention.

FIG. 11 is a schematic cross-sectional view illustrating a disk drive device according to the first exemplary embodiment of the present invention.

With reference to FIG. 11, a disk drive device 900 according to the first exemplary embodiment of the invention includes a motor 910 having the entirety of the foregoing technical characteristics.

The disk drive device 900 according to this embodiment includes a housing 902, an optical pick-up unit 904, and a driving unit 906.

The housing 902 may have an opening 902a, through which a disk D is placed in or taken out, and have an internal space, in which the motor 910, the optical pick-up unit 904 and the driving unit 906 may be installed.

Meanwhile, the base plate 22 (See FIG. 1) including the printed circuit board (PCB) 21 (See FIG. 1) on which the motor 910 is mounted may be fixed in the housing 902.

The optical pick-up unit 904 irradiates light onto the disk D rotated by the motor 910 and receives reflected light therefrom. Namely, the optical pick-up unit 904 may be installed in the housing 902 such that it is disposed under the disk D in order to implement a light scribing function able to print characters, drawings, or the like, on the disk D.

Also, the driving unit 906, connected to the optical pick-up unit 904, moves the optical pick-up unit 904 in a circumferential direction of the disk D.

The driving unit 906 delivers power, generated from a driving motor 906a for the optical pick-up unit 904, to the optical pick-up unit 904 through a power transmission member 906b, and accordingly, the optical pick-up unit 904, while moving in the circumferential direction of the disk D, irradiates light onto the disk D and receives reflected light therefrom.

The motor 910 has been described in detail in the aforementioned embodiments, so a detailed description thereof will be omitted.

As set forth above, according to exemplary embodiments of the invention, a space between a disk and a rotor case communicates with the outside of the space through a flow path portion, and this allows air to flow therethrough, thereby reducing a pressure differential and a temperature differential between the space and the outside of the space.

In addition, a push portion promotes a smoother airflow through the flow path portion, thereby reducing the pressure differential and the temperature differential between the space and the outside of the space more rapidly.

Accordingly, vibrations, generated while the disk D is rotating, can be reduced. As a result, the power consumption of the motor 100 can be reduced.

While the present invention has been shown and described in connection with the exemplary embodiments, it will be apparent to those skilled in the art that modifications and variations can be made without departing from the spirit and scope of the invention as defined by the appended claims.

What is claimed is:

1. A motor comprising:
a rotor case having a chucking device, on which a disk is mounted, press-fitted and coupled thereto;
disk support members mounted on an upper surface of the rotor case to support a bottom surface of the disk, and having each of flow path portions therebetween allowing for airflow in a space between the disk and the rotor case; and
a push portion disposed in at least one of the rotor case and the disk support members to accelerate the airflow through the flow path portions when the rotor case rotates,
wherein the push portion comprises a plurality of recesses spaced apart from each other in the upper surface of the rotor case in a circumferential direction thereof,
wherein the push portion is disposed inwardly in the radial direction of the flow path portion so as to form an annular ring shape,
wherein the push portion is formed to be depressed downwardly in an axial direction from the upper surface of the rotor case, and
wherein the plurality of recesses of the push portion are disposed inwardly of the disk support members in a radial direction while being individually disposed between the flow path portions spaced apart from each other.

2. The motor of claim 1, wherein the push portion comprises a first push portion disposed in the upper surface of the rotor case and a second push portion disposed in at least one of an inner circumferential surface and an outer circumferential surface of a corresponding one of the disk support members.

3. The motor of claim 2, wherein the first push portion comprises a plurality of recesses spaced apart from each other in the upper surface of the rotor case in the circumferential direction thereof, and
the second push portion comprises a concave recess disposed in the outer circumferential surface of the corresponding disk support member.

4. The motor of claim 2, wherein the first push portion comprises a plurality of recesses spaced apart from each other in the upper surface of the rotor case in the circumferential direction thereof, and
the second push portion comprises a concave recess disposed in the outer circumferential surface of the corresponding disk support member and a protrusion disposed on the inner circumferential surface of the corresponding disk support member.

5. The motor of claim 2, wherein the first push portion comprises a plurality of recesses spaced apart from each other in the upper surface of the rotor case in the circumferential direction thereof, and
the second push portion comprises an outer concave recess disposed in the outer circumferential surface of the corresponding disk support member and an inner concave recess disposed in the inner circumferential surface of the corresponding disk support member.

6. The motor of claim 5, wherein the outer and inner concave recesses alternate with each other.

7. The motor of claim 5, wherein the first push portion is disposed inwardly of the corresponding disk support member in a radial direction so as to correspond to the inner concave recess of the second push portion.

8. The motor of claim 1, wherein the push portion comprises a protrusion disposed on an inner circumferential surface of a corresponding one of the disk support members.

9. The motor of claim 1, wherein the push portion comprises a concave recess disposed in an inner circumferential surface of a corresponding one of the disk support members.

10. The motor of claim 1, wherein the flow path portions are slanted with respect to a radial direction.

11. A disk drive device comprising:
a housing having an opening allowing a disk to be taken in or out therethrough;
the motor according to claim 1 mounted in the housing;
an optical pick-up unit irradiating light onto the disk rotated by the motor and receiving reflected light therefrom; and
a driving unit moving the optical pick-up unit in a circumferential direction of the disk.

\* \* \* \* \*

UNITED STATES PATENT AND TRADEMARK OFFICE
CERTIFICATE OF CORRECTION

PATENT NO. : 8,756,618 B2  
APPLICATION NO. : 13/887978  
DATED : June 17, 2014  
INVENTOR(S) : Smirnov et al.

Page 1 of 1

It is certified that error appears in the above-identified patent and that said Letters Patent is hereby corrected as shown below:

References Cited

On the Title Page Item [56] (OTHER PUBLICATIONS), Line 2, delete "2011-010556. X." and insert -- 2011-010556. --, therefor.

Signed and Sealed this  
Ninth Day of September, 2014

Michelle K. Lee  
*Deputy Director of the United States Patent and Trademark Office*